(12) United States Patent
Yu (10) Patent No.: US 8,990,913 B2
(45) Date of Patent: Mar. 24, 2015

(54) PEER APPLICATIONS TRUST CENTER

(75) Inventor: Loc An Yu, Seattle, WA (US)

(73) Assignee: AT&T Mobility II LLC, Atlanta, GA (US)

(*) Notice: Subject to any disclaimer, the term of this patent is extended or adjusted under 35 U.S.C. 154(b) by 116 days.

(21) Appl. No.: 13/448,456

(22) Filed: Apr. 17, 2012

(65) Prior Publication Data

US 2013/0276086 A1 Oct. 17, 2013

(51) Int. Cl.
*G06F 7/04* (2006.01)
*G06F 15/16* (2006.01)
*G06F 21/51* (2013.01)
*H04L 29/06* (2006.01)

(52) U.S. Cl.
CPC .......... *G06F 21/51* (2013.01); *G06F 2221/033* (2013.01); *H04L 63/00* (2013.01); *H04L 63/0807* (2013.01)
USPC .............................................. 726/9; 380/277

(58) Field of Classification Search
USPC ............................................................ 726/9
See application file for complete search history.

(56) References Cited

U.S. PATENT DOCUMENTS

| | | | |
|---|---|---|---|
| 7,444,464 B2 * | 10/2008 | Urmston et al. | 711/108 |
| 2003/0225924 A1 * | 12/2003 | Jung et al. | 709/313 |
| 2007/0079113 A1 * | 4/2007 | Kulkarni et al. | 713/150 |
| 2012/0167185 A1 * | 6/2012 | Menezes et al. | 726/5 |
| 2012/0246710 A1 * | 9/2012 | Chakra et al. | 726/9 |
| 2012/0254957 A1 * | 10/2012 | Fork et al. | 726/6 |
| 2012/0272306 A1 * | 10/2012 | Benaloh et al. | 726/9 |
| 2013/0024577 A1 * | 1/2013 | Krishnaswamy et al. | 709/227 |
| 2013/0042110 A1 * | 2/2013 | Shablygin et al. | 713/168 |
| 2013/0047218 A1 * | 2/2013 | Smith | 726/4 |
| 2013/0047246 A1 * | 2/2013 | Radhakrishnan | 726/9 |
| 2013/0061310 A1 * | 3/2013 | Whitmyer, Jr. | 726/9 |
| 2013/0067555 A1 * | 3/2013 | Toomey | 726/9 |

OTHER PUBLICATIONS

Huaizhi Li; Trust Management in Distributed Systems; Year—2007; IEEE; pp. 1-9.*
"PeerTrust Overview," http://www.cc.gatech.edu/projects/disl/PeerTrust/overview.html, accessed Apr. 5, 2012.
Chandran, S.M. et al., "A Requirements-Driven Trust Framework for Secure Interoperation in Open Environments," Trust Management, Lecture Notes in Computer Science, 2006, vol. 3986/2006, 33-47.
Wray, J., "Generic Security Service API Version 1 : C-bindings," Standards Track, RFC 2744, Jan. 2000.

* cited by examiner

*Primary Examiner* — Shewaye Gelagay
*Assistant Examiner* — Monjour Rahim
(74) *Attorney, Agent, or Firm* — Hartman & Citrin LLC (57) ABSTRACT

Concepts and technologies are disclosed herein for a peer applications trust center. A trust client can execute on a client computer and a trust service can execute on a server computer to provide the peer applications trust center. The trust client or trust server can register applications. During registration, the trust server or the trust client can generate a public key or other identifier for identifying the registered application. If another application requests access to the registered application, the trust server or the trust client can determine if the request specifies a registered application by name. If the requestor is granted access to the application, the requestor can be issued a token. Tokens can be revoked, updated, replaced, or renewed for various purposes.

16 Claims, 6 Drawing Sheets

PEER APPLICATIONS TRUST CENTER

BACKGROUND

Businesses and consumers often use applications to manage or interact with data from various sources. In some business scenarios, one or more applications may be developed to control or manage data from various systems or other sources. These applications sometimes are created by programmers employed by the businesses. In some instances, these applications can be created by OEMs. These and other applications sometimes are developed over time and/or extensive effort to provide a rich experience for users.

In some circumstances, various applications that are valuable or important for business operations may become outdated and/or otherwise incompatible with future applications or other systems used by a business. For example, businesses may want some applications to communicate with one another to provide particular functionality, but may be unable to do so without writing and implementing new code and/or versions of the software.

Similarly, some settings or configurations associated with applications may be protected or otherwise inaccessible to users and/or applications. Enabling applications to communicate with one another may require creation of a new application or a new application programming interface ("API") to support these and other types of communications between the applications. Still further, as operating systems evolve and/or are adopted by some application users, APIs and/or application functionality, configurations, and/or settings may be inaccessible and/or unusable or incompatible with applications executing on the evolved or newly-adopted operating systems.

SUMMARY

The present disclosure is directed to a peer applications trust center. The peer applications trust center can include a trust client executing on a client computer and a trust service executing on a server computer in communication with the trust client. The trust client can be configured to register applications and/or to submit information to the trust server for registration of the applications. During registration of the applications, the trust server or the trust client can generate a public key or other identifier associated with the application. If another application requests access to the registered application, the trust server or the trust client can determine if the request specifies a registered application by name.

If the request specifies a registered application by a correct and/or current name, the trust server can be configured to grant access to the requestor. The requestor can be issued a token for accessing the application. The tokens can be assigned a life or a time period for which the tokens will be valid. If the life or time period expires, the tokens can be revoked, new tokens can be issued, and a trust relationship between the requestor and the application can be reestablished using a new token. As such, trust relationships can be kept up to date, if desired.

According to one aspect of the concepts and technologies disclosed herein, a method is disclosed. The method can include registering, at a trust service, an application. Registering the application can include generating an identifier associated with the application. The method also can include receiving a request to establish a trust relationship between a requestor associated with the request and the application and determining if the trust relationship is to be established. The method also can include issuing a token to the requestor in response to determining that the trust relationship is to be established and issuing an error code, in response to determining that the trust relationship is not to be established.

In some embodiments, the method further includes receiving an application access request from the requestor, the application access request comprising the identifier, and challenging the requestor, based upon the identifier, to determine if the access request is to be granted. The identifier can include a globally unique identifier. The request to establish the trust relationship can include a name associated with the application. In some embodiments, determining if the trust relationship is to be established can include examining the name, determining if the name includes a recognized identifier associated with the application, and determining that the trust relationship is to be established, if the name includes the recognized identifier. In some embodiments, issuing the token can include determining a time period for which the token is to be valid, specifying the life of the token, the life of the token including data indicating the time period, and issuing the token with the specified life of the token.

The method also can include determining if the token is expired, and issuing a new token, in response to determining that the token is expired. The method also can include determining that a new version of the token is available, revoking the token, and issuing the new version of the token. In some embodiments, the application includes an application executing on a first application server, and the requestor includes a further application executing on a further application server. The error code can specify an error associated with the request. The error code also can include an action code, which can specify an action to be taken in response to determining that the trust relationship is not to be established.

According to another aspect of the concepts and technologies disclosed herein, another method is disclosed. The method can include registering, at a trust service in communication with an application server, an application executing on the application server. The method also can include generating a globally unique identifier associated with the application and receiving, from a requestor in communication with the trust service, a request to establish a trust relationship between the requestor and the application executed by the application server. The request to establish the trust relationship can include a name associated with the application. The method also can include determining if the trust relationship is to be established based, at least partially, upon the name included in the request, issuing, to the requestor, a token, in response to determining that the trust relationship is to be established, and issuing an error code, in response to determining that the trust relationship is not to be established.

In some embodiments, the requestor is a further application executed by a further application server. The method also can include receiving an application access request from the requestor, the application access request including the identifier; and challenging the requestor, based upon the identifier, to determine if the access request is to be granted. In some embodiments, determining if the trust relationship is to be established includes examining the name, determining if the name includes a recognized identifier associated with the application, and determining that the trust relationship is to be established, if the name includes the recognized identifier. In some embodiments, the error code specifies an action to be taken in response to determining that the trust relationship is not to be established.

According to yet another aspect, a computer storage medium is disclosed. The computer storage medium can have computer-executable instructions stored thereon that, when executed by a server computer, cause the server computer to execute a method. The method can include registering, at the computer, an application executing on an application server in communication with the computer and generating an identifier associated with the application. The method also can include receiving, from a requestor in communication with the computer, a request to establish a trust relationship between the requestor and the application executed by the application server. The request to establish the trust relationship can include a name associated with the application. The method also can include determining if the trust relationship is to be established based, at least partially, upon the name included in the request, issuing, to the requestor, a token, in response to determining that the trust relationship is to be established, and issuing an error code, in response to determining that the trust relationship is not to be established.

In some embodiments, the requestor includes a further application executed by a further application server, and the identifier includes a globally unique identifier. The method also can include receiving an application access request from the requestor, the application access request including the identifier; and challenging the requestor, based upon the identifier, to determine if the access request is to be granted. In some embodiments, determining if the trust relationship is to be established can include examining the name, determining if the name includes a recognized identifier associated with the application, and determining that the trust relationship is to be established, if the name includes the recognized identifier.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to a peer applications trust center, which can be provided by a trust client executing on a client computer and a trust service executing on a server computer in communication with the trust client. The trust client can be configured to register applications executing on application servers in communication with the trust client and/or the client computer, and/or to submit information to the trust server for registration of the applications. During registration of the applications, the trust server or the trust client can generate a public key or other identifier associated with the application. In some instances, the public key or other identifier can include a globally unique identifier. If another application requests access to the registered application, the trust server or the trust client can determine if the request specifies a registered application by name. If the requestor is granted access to the application, the requestor can be issued a token. The tokens can be assigned a life or a time period for which the tokens will be valid. If the life or time period expires, the tokens can be revoked, new tokens can be issued, and a trust relationship between the requestor and the application can be reestablished using a new token. The tokens also can be revoked or replaced for other purposes. As such, trust relationships can be kept up to date, if desired.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
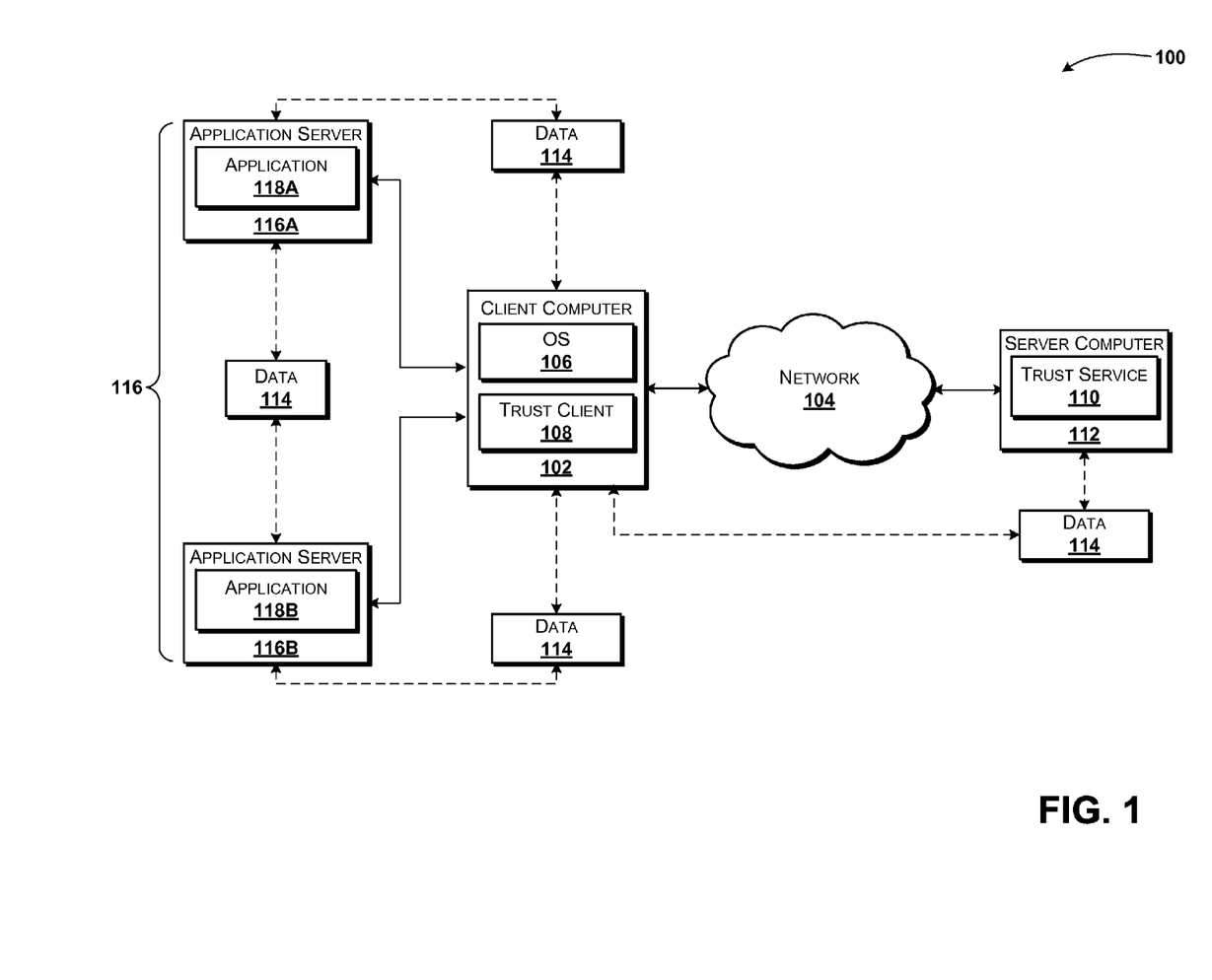
FIG. 1 is a system diagram illustrating an illustrative operating environment for the various embodiments disclosed herein.

Referring now to FIG. 1, aspects of an operating environment 100 for various embodiments of the concepts and technologies disclosed herein for a verification service for providing data delivery with sender verification will be described, according to an illustrative embodiment. The operating environment 100 shown in FIG. 1 includes a client computer 102 operating in communication with and/or as part of a communications network ("network") 104. According to various embodiments, the functionality of the client computer 102 may be provided by one or more server computers, desktop computers, mobile telephones, smart phones, laptop computers, set-top boxes, other computing systems, and the like. Furthermore, it should be understood that the functionality of the client computer 102 can be provided by a single device, by two similar devices, and/or by two or more dissimilar devices. For purposes of describing the concepts and technologies disclosed herein, the client computer 102 is described herein as a personal computer. It should be understood that this embodiment is illustrative, and should not be construed as being limiting in any way.

The client computer 102 can execute an operating system 106 and one or more application programs such as, for example, a trust client application or module ("trust client") 108. The operating system 106 is a computer program for controlling the operation of the client computer 102. The trust client 108 is an executable program configured to execute on top of the operating system 106 to provide various functions described herein for establishing and/or managing trust relationships between applications. Although the trust client 108 and the operating system 106 are illustrated as separate entities executed by the client computer 102, it should be understood that in some embodiments, the functionality described herein with respect to the trust client 108 is provided by the operating system 106. In other words, the trust client 108 and/or the functionality associated therewith can be provided by the operating system 106. In some embodiments, including the functionality of the trust client 108 within the operating system 106 can enhance security of the trust client 108 relative to the illustrated embodiments wherein the trust client 108 is an application executed on top of the operating system 106. It should be understood that these embodiments are illustrative, and should not be construed as being limiting in any way.

As used herein, the phrase "trust relationship" and variants thereof can be used to refer to a relationship between one or more applications or services. When applications or services share a trust relationship, the applications or services can expose or share provisioning, configuration information, settings, or other application- or service-related information or data with other applications or servers. As such, the concepts and technologies disclosed herein for establishing and managing trust relationships can be used to allow two previously unknown or unrelated applications or services to trust one another and expose services and/or information to one another. These and other aspects of trust relationships are described in more detail below, as are various concepts and technologies for establishing, managing, and/or revoking trust relationships.

Although the trust client 108 is illustrated as a component of the client computer 102, it should be understood that the trust client 108 may be embodied as or in a stand-alone device or component thereof operating as part of or in communication with the network 104 and/or the client computer 102. As such, the illustrated embodiment should be understood as being illustrative of only some contemplated embodiments and should not be construed as being limiting in any way.

According to various contemplated embodiments of the concepts and technologies disclosed herein, the trust client 108 can be configured as an application or an application programming interface ("API") that executes on the client computer 102. The trust client 108 can be configured to communicate with a trust management application, module, or service ("trust service") 110. The trust service 110 can be executed, hosted, or otherwise provided by or associated with a server computer 112 that operates as a part of, or in communication with, the network 104. As will be described in more detail below, the trust service 110 can be configured to manage and selectively share application or service identifiers or public keys with requesting applications or services ("requestors"), to issue, update, and/or revoke tokens that can be used by the requestor to access applications or services, and to control registration and/or deregistration of applications or services with the trust service 110.

According to various embodiments, the trust client 108 and the trust service 110 can be configured to communicate with one another through one or more secured communication channels established over a public domain associated with the network 104. In some other embodiments, the trust client 108 and the trust service 110 can communicate using unsecured communication channels, for example, when the trust client 108 and the trust service 110 are hosted by real or virtual resources within a same domain, as well as in scenarios in which the trust client 108 and the trust service 110 are executed by devices or resources within a trust relationship, as described in more detail below. As such, when communications between the trust client 108 and the trust service 110 are described herein, it should be understood that such communications can be secured and/or unsecured.

As will be explained in more detail below, the trust client 108 and the trust service 110 can exchange various queries, responses, error codes, keys, tokens, and/or other information or data (collectively illustrated and/or referred to herein as "data") 114 to provide the functionality described herein for establishing and managing a trust relationship between applications. In addition to exchanging the data 114, the trust client 108 and/or the trust service 110 can be configured to store the data 114 at the client computer 102 and/or the server computer 112, respectively, or to access or store the data 114 in a database or other data storage device. The various communications and/or data 114 relating to the communications are described in more detail below.

The illustrated operating environment 100 can include two or more application servers 116A-B (hereinafter collectively and/or generically referred to as "application servers 116"). The application servers 116 can be configured to host and/or execute one or more applications or services ("applications") 118A-B (hereinafter collectively and/or generically referred to as "applications 118"). According to various embodiments, the applications 118 can be configured to access the trust client 108 of the client computer 102 to access functionality of the trust client 108 for establishing and/or maintaining a trust relationship between the applications 118. According to various embodiments, each of the applications 118 can be configured with particular settings or configurations relevant to respective services associated with the applications 118. As such, the communications between the trust client 108 and the trust service 110, and/or the data 114 exchanged between the trust client 108 and the trust service 110, can relate to queries and responses for requesting or granting access among the applications 118, as is explained in more detail herein, particularly with reference to FIGS. 2-4.

According to some embodiments of the concepts and technologies disclosed herein, the trust client 108 can be configured to support registration of applications 118. The trust client 108 can be configured to assign to the applications 118, or services associated with the applications 118, a globally unique name for identifying the application 118. The globally unique name is referred to herein as a "public key." As will be explained in more detail below, an application or service ("requestor") requesting another application or service ("target"), or information associated therewith, can submit a query to the trust client 108. The query can identify the target application or service by name. The public key for a particular application 118 can be represented by and/or stored as the data 114.

As mentioned above, the trust client 108 can be configured to receive requests for the target. According to various embodiments, the requests can correspond to a query that specifies a requested service or application by name. The requests and/or the responses thereto also are represented in FIG. 1 as the data 114. If the trust client 108 determines that the requested application or service ("target") exists, the trust client 108 can determine if an up-to-date token that can be used by the requestor to access the target application or service named in the request. If the trust client 108 determines that no up-to-date token is available, the trust client 108 can issue an error code to the requestor indicating one or more errors. The tokens and error codes are also illustrated in FIG. 1 as the data 114. As such, it can be appreciated that the data 114 illustrated in FIG. 1 can include queries, responses, keys, tokens, and/or error codes. It should be understood that this embodiment is illustrative, and should not be construed as being limiting in any way.

The trust client 108 can be configured as a trusted entity for any application 118 configured to access the trust client 108. As such, the trust client 108 also can be configured to invoke trust management functionality with respect to any registered application 118. Thus, the trust client 108 also can be configured to update, revoke, add, and/or remove tokens associated with the applications 118. Two illustrative methods for updating tokens are illustrated below with reference to FIGS. 3-4.

In operation, the application 118A can be created and can be configured to access the trust client 108. Similarly, the application 118B can be created and can be configured to access the trust client 108. The applications 118 can register with the trust client 108. During registration, each of the applications 118 can be assigned globally unique identifiers that can be stored as public keys by the trust client 108. As mentioned above, the public keys can be stored as the data 114.

If the application 118A corresponds to a requestor and the application 118B corresponds to a target, the application 118A can submit a request or the trust client 108. The request can be used by the application 118A to request access to the application 118B. The requested access can include a request to use a service associated with the application 118B, a request for configurations, settings, options, or other information associated with the application 118B, and/or a request for other information or functionality associated with the application 118B.

While previous approaches to managing trust between applications may have included creating specific APIs and/or other "hooks" for accessing information associated with the application 118B, the concepts and technologies disclosed herein can provide an operating-system-agnostic approach for accessing the application 118B. Furthermore, the concepts and technologies disclosed herein can be used to support interactions between any registered applications 118, regardless of languages, protocols, or other application-specific variables, and/or without requiring specifically-tailored APIs or other specialized access mechanisms.

The trust client 108 can respond with a trust token ("token") for accessing the application 118B, and the requestor can use the token to access the application 118B. It can be appreciated, therefore, that the registration of applications 118 and the issuance of a token to one or more of the applications 118 can correspond, in some embodiments, to the establishment of a trust relationship between the applications 118. As will be described in more detail herein, the trust client 108 also can be configured to manage the trust relationship by renewing, revoking, reissuing, and/or otherwise updating the tokens, by deregistering and/or ordering self destruction of registered applications, suspending applications or ordering applications to suspend execution, and/or to take other actions with respect to trust relationships. As such, the trust client 108 can be configured to establish and/or manage trust relationships by issuing and managing tokens and/or by issuing or invoking various error codes or action codes.

FIG. 1 illustrates one client computer 102, one network 104, one server computer 112, and two application servers 116. It should be understood, however, that various implementations of the operating environment 100 include multiple client computers 102, multiple networks 104, multiple server computers 112, and less than two or more than two application servers 116. As such, the illustrated embodiment should be understood as being illustrative, and should not be construed as being limiting in any way.

Figure 2:
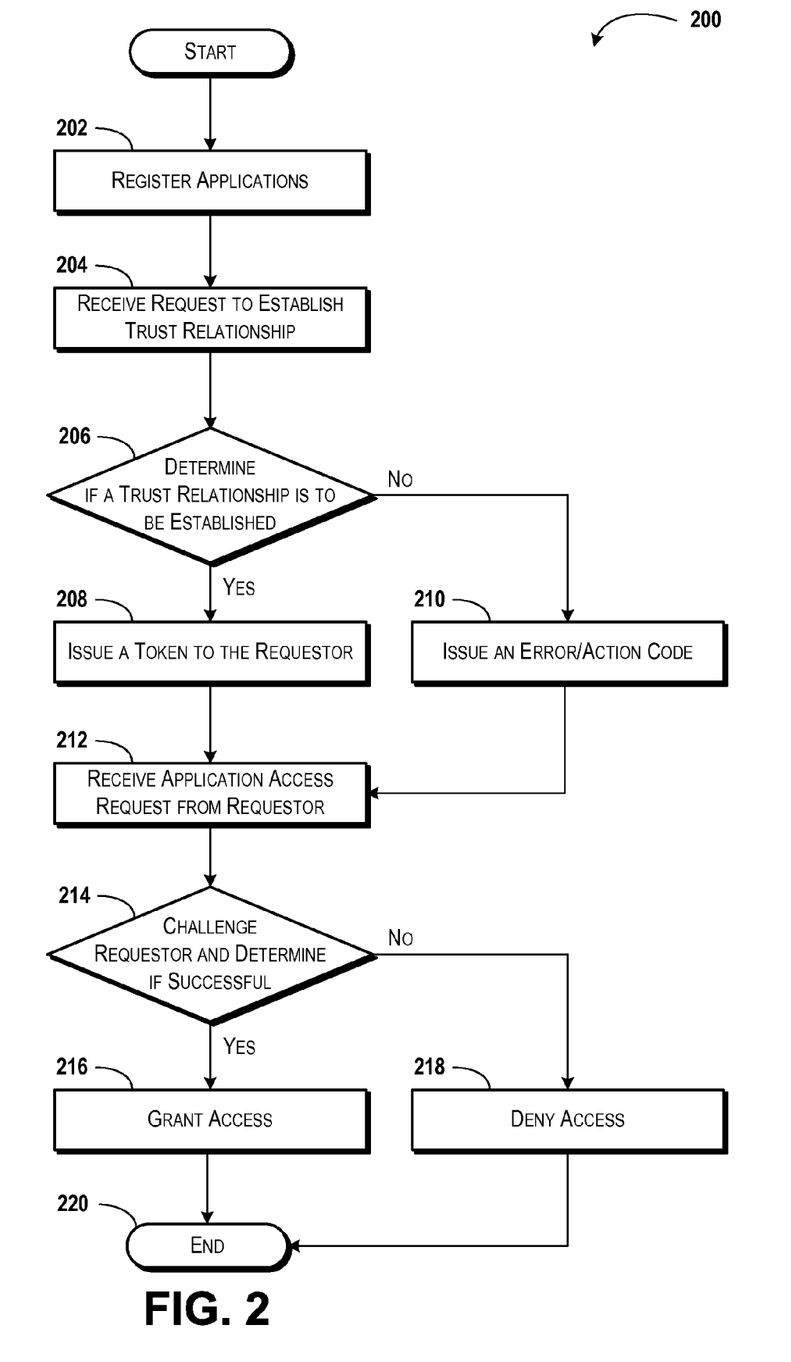
FIG. 2 is a flow diagram showing aspects of a method for establishing a trust relationship between applications, according to an illustrative embodiment.

Turning now to FIG. 2, aspects of a method 200 for establishing a trust relationship between applications will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the methods disclosed herein are described as being performed by the client computer 102 via execution of one or more software modules such as, for example, the trust client 108. It should be understood that additional and/or alternative devices and/or network nodes can provide the functionality described herein via execution of one or more modules, applications, and/or other software including, but not limited to, the trust client 108. Furthermore, it can be appreciated from the above description that the trust client 108 can provide the functionality described herein via one or more interactions with a trust service 110. Thus, the illustrated embodiments are illustrative, and should not be viewed as being limiting in any way.

The method 200 begins at operation 202, wherein the client computer 102 can register or complete registration for two or more applications 118. During registration of the applications 118, the client computer 102 and/or the trust client 108 executed thereon, can access the trust service 110 to obtain and/or store public keys associate with the applications 118. For example, the trust client 108 can query the trust service 110. The query can include a request for a public key for one or more of the applications 118, and the trust service 110 can respond to the query with one or more public keys. As mentioned above, the public keys can be provided to the client computer 102 as the data 114. According to various embodiments, the public keys can include globally unique identifiers ("GUIs") that can be used to uniquely identify services associated with the applications 118. Because other forms of unique identifiers can be used instead of, or in addition to, the GUIs mentioned above, it should be understood that this embodiment is illustrative, and should not be construed as being limiting in any way.

From operation 202, the method 200 proceeds to operation 204, wherein the client computer 102 receives a request to establish a trust relationship between two or more of the applications registered in operation 202. According to various embodiments, the client computer 102 can receive the request from one or more of the applications 118. For purposes of clarifying the concepts and technologies disclosed herein, the embodiment illustrated in FIG. 2 is described with reference to a requesting application such as the application 118A (hereinafter also referred to as the "requestor" for clarity) and a targeted or requested application or service such as the application 118B (hereinafter also referred to as the "target application" for clarity). The requestor can submit the request to the trust client 108 as the data 114.

According to various embodiments, the request received in operation 204 can specify a name or other identifier for the target application or other requested service or application. The name or other identifier can include a GUI, as mentioned above, or other information for uniquely identifying one or more applications 118. The name or other identifier can be used by the client computer 102 and/or the trust client 108 executed thereon to determine if a trust relationship is to be established between the requestor and the target application. It should be understood that this embodiment is illustrative, and should not be construed as being limiting in any way.

From operation 204, the method 200 proceeds to operation 206, wherein the client computer 102 can determine if the trust relationship is to be established. As mentioned above, the determination illustrated in operation 206 can include evaluating the name specified in the query received in operation 204 to determine if the specified name corresponds to a registered application 118. In some embodiments, the name specified in the query corresponds to an active name associated with a registered application 118. In these and other circumstances, the client computer 102 can determine that the trust relationship is to be established, though this is not necessarily the case. In some other embodiments, the name specified in the query corresponds to an inactive or unrecognized name. In these and other circumstances, the client computer 102 can determine that the trust relationship is not to be established, though this is not necessarily the case.

If the client computer 102 determines, in operation 206, that the trust relationship is to be established, the method 200 proceeds to operation 208. In operation 208, the client computer 102 can issue a token to the requestor. The token issued in operation 208 can be used by the requestor to authenticate with the targeted application and/or otherwise to communicate with the targeted application via a trusted connection. Thus, the requestor can use the token to establish and/or leverage a trust relationship between the requestor and the target application, for example, to obtain configurations, to obtain settings, to share other information, or the like.

If the client computer 102 determines, in operation 206, that the trust relationship is not to be established, the method 200 proceeds to operation 210. At operation 210, the client computer 102 can issue an error or action code. It should be understood that the error or action code issued in operation 210 also can be obtained from the trust service 110. As such, operation 210 can include receiving an error or action code as well as providing the error or action code to one or more of the requestor or the target application. Some illustrative error and/or action codes are described below with reference to FIGS. 3-4.

From operation 208, the method 200 proceeds to operation 212. The method 200 also can proceed to operation 212 from operation 210. It should be understood, however, that in some embodiments execution of the method 200 ends after operation 210, though this embodiment is not illustrated in FIG. 2. In operation 212, the client computer 102 receives an application access request from an application 118 such as, for example, the requestor. It should be understood that the access request can occur at any time. Thus, execution of the method 200 can pause or be interrupted at operation 212 unless and/or until an application access request associated with the requestor is received. Because the application access request can occur immediately after operations 208 or 210, it should be appreciated that a pause or interruption is not required in any of the described embodiments.

The application access request received in operation 212 can include identification of the requested application 118. Additionally, the application access request can include a token such as the token issued in operation 208. From operation 212, the method 200 proceeds to operation 214, wherein the client computer 102 can challenge the requestor and determine if the application access request is successful. Thus, the client computer 102 can examine the contents of the application access request received in operation 212 and determine if access is to be granted or denied. In some embodiments, the client computer 102 determines if a token is included in the application access request, and if so, if the token is up-to-date, or the like.

If the client computer 102 determines, in operation 214 that the token is included in the application access request and/or that the token is valid, the method 200 can proceed to operation 216. In operation 216, the client computer 102 can grant access to the application and/or instruct the target application to communicate with the requestor. As mentioned above, the access granted in operation 216 can relate to accessing settings, configurations, data, and/or other information associated with the application 118B.

If the client computer 102 determines, in operation 214 that a token is not included in the application access request and/or that the token is invalid, the method 200 can proceed to operation 218. In operation 218, the client computer 102 can deny access to the application and/or instruct the target application not to communicate with the requestor. Additionally, as mentioned above with regard to operation 210, the client computer 102 can be configured to issue or instruct other nodes or devices to issue one or more error codes or action codes in response to determining that access to the target application is to be denied.

From operation 216, the method 200 proceeds to operation 220. The method 200 also can proceed to operation 220 from operation 218. The method 200 ends at operation 220.

Figure 3:
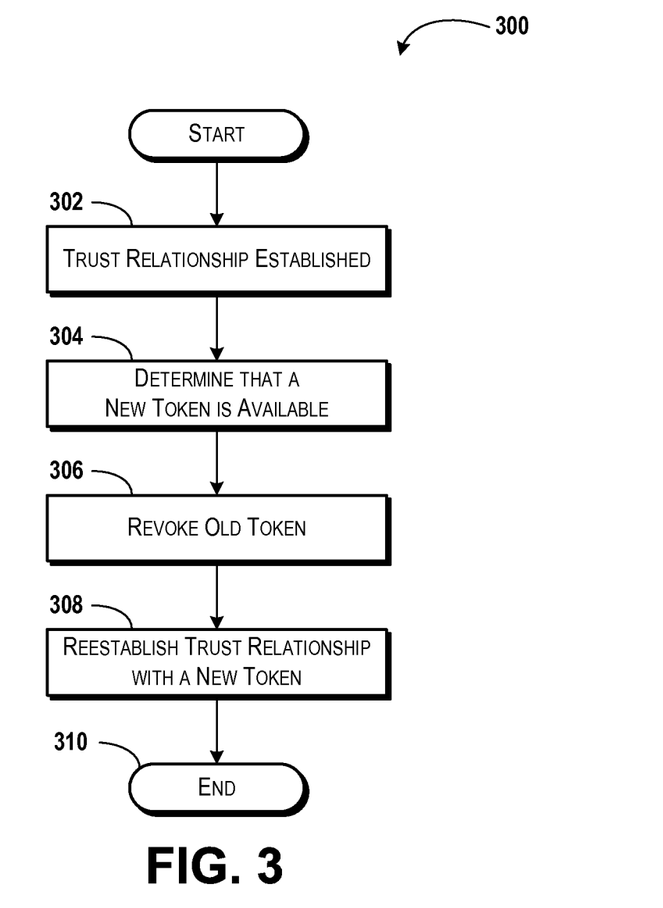
FIG. 3 is a flow diagram showing aspects of a method for revoking and renewing a trust relationship between applications, according to another illustrative embodiment.

Turning now to FIG. 3, aspects of a method 300 for revoking and renewing a trust relationship between applications will be described in detail, according to an illustrative embodiment. The method 300 is described as being performed by the client computer 102. As explained above with reference to FIGS. 1-2, however, the functionality described herein with respect to FIG. 3 can be provided by the trust service 110 instead of, or in conjunction with, the trust client 108 executed by the client computer 102. As such, the described embodiment should be understood as being illustrative and should not be construed as being limiting in any way.

The method 300 begins at operation 302, wherein the client computer 102 establishes a trust relationship between two or more applications 118. It should be understood that the functionality of the client computer 102 with respect to operation 302 can correspond to the functionality of the client computer 102 described above with reference to operations 208 of the method 200 illustrated in FIG. 2. Because trust relationships can be established in other ways, it should be understood that this embodiment is illustrative, and should not be construed as being limiting in any way.

From operation 302, the method 300 proceeds to operation 304, wherein the client computer 102 determines that a new token is available. For example, the client computer 102 can receive an action code or error code that specifies that a new token is available and/or that the existing token is to be revoked. The error code or action code can be issued, for example, in operations 210 or 218 of the method 200 described above. Because the client computer 102 can determine that a new token is available and/or that an old token is to be revoked in a number of ways, it should be understood that these embodiments are illustrative, and should not be construed as being limiting in any way.

From operation 304, the method 300 proceeds to operation 306, wherein the client computer 102 can revoke the old token. As such, the client computer 102 can communicate with the target application and/or the requestor to indicate that the token possessed by the requestor has been revoked. As such, operation 306 can include instructing the target application not to accept the old token. It should be understood that this embodiment is illustrative, and should not be construed as being limiting in any way.

From operation 306, the method 300 proceeds to operation 308, wherein the client computer 102 can reestablish the trust relationship with the new token. It should be understood that the functionality of the client computer 102 for reestablishing the trust relationship in operation 308 can be similar or even identical to the functionality of the client computer 102 described above with reference to FIG. 2.

From operation 308, the method 300 proceeds to operation 310. The method 300 ends at operation 310. It can be appreciated from FIG. 3 that the client computer 102 can be configured to ensure that a trust relationship between applications 118 is kept current and/or that shared tokens can be revoked or updated periodically to prevent inadvertent disclosure and/or use by unauthorized entities. According to various embodiments, the client computer 102 can be configured not to store tokens or private keys. As such, the illustrated embodiments should be understood as being illustrative and should not be construed as being limiting in any way.

Figure 4:
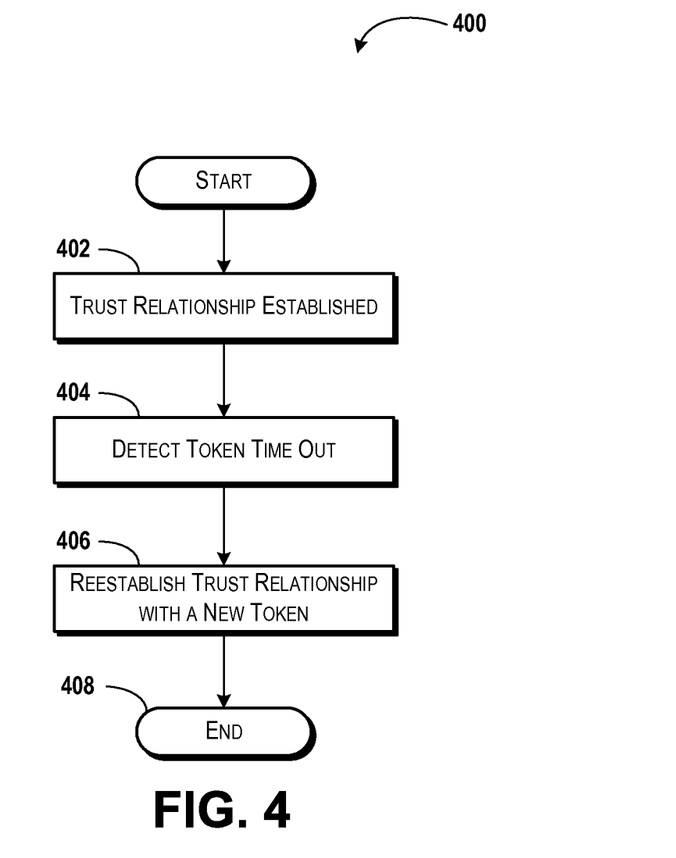
FIG. 4 is a flow diagram showing aspects of a method for renewing a trust relationship between applications, according to another illustrative embodiment.

Turning now to FIG. 4, aspects of a method 400 for renewing a trust relationship between applications 118 will be described in detail, according to an illustrative embodiment. The method 400 is described as being performed by the client computer 102. As explained above with reference to FIG. 3, however, the functionality described herein with respect to FIG. 4 can be provided by the trust service 110 instead of, or in conjunction with, the trust client 108 executed by the client computer 102. As such, the described embodiment should be understood as being illustrative and should not be construed as being limiting in any way.

The method 400 begins at operation 402, wherein the client computer 102 establishes a trust relationship between two or more applications 118. It should be understood that the functionality of the client computer 102 with respect to operation 402 can be, but is not necessarily, similar or even identical to the functionality of the client computer 102 described above with reference to operations 208 of the method 200 illustrated in FIG. 2.

From operation 402, the method 400 proceeds to operation 404, wherein the client computer 102 determines that the token used by the applications 118 has timed out. In some embodiments, for example, the client computer 102 can be configured to establish a lifetime or persistence period for tokens issued by the client computer 102. Thus, the client computer 102 can determine, in operation 404, that the lifetime or persistence period has ended or otherwise terminated. Such a determination can be completed by the client computer 102 by comparing a present time with a determined termination or lapse time specified when issuing or receiving the token, by expiration of a countdown timer, by receiving notice that the token has expired, combinations thereof, or the like. Because the client computer can be configured to determine that the token has timed out in a number of ways, it should be understood that these embodiments are illustrative, and should not be construed as being limiting in any way.

From operation 404, the method 400 proceeds to operation 406, wherein the client computer 102 can reestablish the trust relationship with a new token. It should be understood that the functionality of the client computer 102 for reestablishing the trust relationship in operation 406 can be similar or even identical to the functionality of the client computer 102 described above with reference to FIG. 2. From operation 406, the method 400 proceeds to operation 408. The method 400 ends at operation 408.

It can be appreciated from FIG. 4 that the client computer 102 can be configured to ensure that a trust relationship between applications 118 is kept current and/or that tokens are updated periodically at predetermined intervals. Thus, the concepts and technologies disclosed herein can be used to help prevent inadvertent disclosure and/or use of secure application data by unauthorized entities. The illustrated embodiments should be understood as being illustrative and should not be construed as being limiting in any way.

As explained above with reference to various FIGURES, the trust client 108, the trust service 110, and/or various devices executing the trust client 108 and/or the trust service 110 can be configured to issue one or more action codes or error codes. Some contemplated error codes, action codes, and their respective implications are set forth below in TABLE 1. These and other action codes or error codes can be used to establish and/or manage trust relationships as described herein in detail.

TABLE 1

| Error Code | Meaning | Action |
| --- | --- | --- |
| AC_Register_Key | Register this key with this name | Register this public key with this name. |
| EC_Not_Found | This name is not found in the data | Do not register this name |
| AC_Revoked | This name has been revoked | If this name was registered, revoke all trust relationship associated with this name |

TABLE 1-continued

| Error Code | Meaning | Action |
|---|---|---|
| AC_New_Version_Required | This name is obsolete, a new name is required | Do not revoke old trust relationships associated with old name. Tell this named application to update. This allows applications submitted requests with the old name to obtain access until updated. The update process can be used to clean up old registrations. |
| AC_Destroy_Now | This name is to be destroyed now | Tell the named application to destroy itself now. |
| EC_Suspended | This named application has been suspended | Put this application in suspended status. No trust relationship can be established when the application is suspended. This Error code also can dictate further action, such as revoking all active tokens associated with this named application. |
| AC_Set_Active | If this named application was suspended before, set it as active | Whatever state this application was in, set this state as active now. Register this key (value of status response). |
| AC_Try_Again_Later | This action cannot be completed now. Try again later. | Query with the same query again X minutes later as specified in the value of the status response, wherein X can be specified by user settings or options. |
| AC_Self_Destruct | The trust service and/or the trust client have been compromised. Revoke all tokens and delete all data. | Revoke all trust tokens. Wipe client database or other device storing the data. Enter self-destruct mode (do not respond to any query, do not query server, lock database). This only destroys the Trust Center. |
| AC_Self_Upgrade | The trust client must be upgraded | Upgrade the trust client now. Upgrade does not affect existing trust relationships. |
| EC_Challenge_Z | Challenge the requestor with this Z value | Use this value to challenge the requestor |
| EC_Challenge_Response | Comparison of P from the trust client, and P calculated on the trust server | Value 1 = matched. Value 0 = not matched. |
| EC_Request_Complete_Successfully | Request complete successfully. The value carries the result of the query, if applicable | Non-zero result code determines the action to take. |
| EC_Request_Complete_with_Error | Request complete with error. The value carries the error result | Error result determines the action to take. |
| EC_Cannot_Perform_Request | Request cannot be complete due to an error. Error code has the details | Error code determines the action to take. |

TABLE 1-continued

| Error Code | Meaning | Action |
|---|---|---|
| AC_Processing_Wait | The trust client is processing this request. Wait this long before timeout | Set the timer to wait for the following response. When timer expires, re-send the request. The entity sending this status also runs a timer that will abandon this request when the timer expires. |
| AC_Revoke_Token | Mark this token as revoked | Requestor using this revoked token must not be allowed to use the service. |
| AC_Remove_Token | Remove this token from list | Erase/delete/remove this token from a tokens list |
| AC_Set_Token | Set or add token to tokens list | Set or add token to tokens list |

Figure 5:
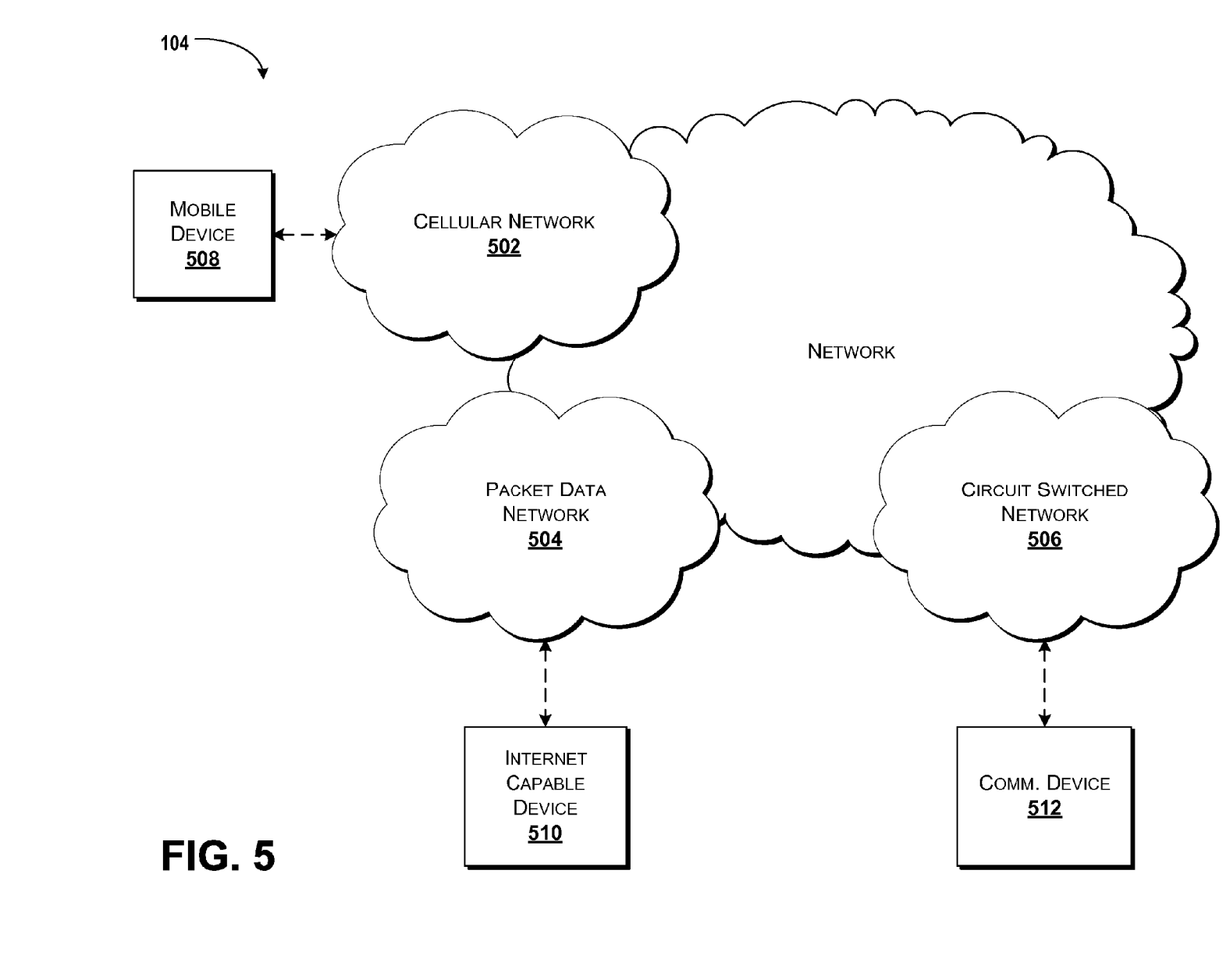
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network is generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations of the concepts and technologies disclosed herein, the client computer 102 and/or the server computer 112 can communicate with any combination of the devices disclosed herein including, but not limited to, the mobile communication device 508, the Internet capable device 510, and/or the communications device 512 to generate queries, to generate responses, to generate and/or save public keys or tokens, and/or to issue error codes, action codes, and/or other instructions. As such, it should be understood that the client computer 102 and the server computer 112 can interact with one another and/or the application servers 116 via any number and/or combination of devices and networks.

Figure 6:
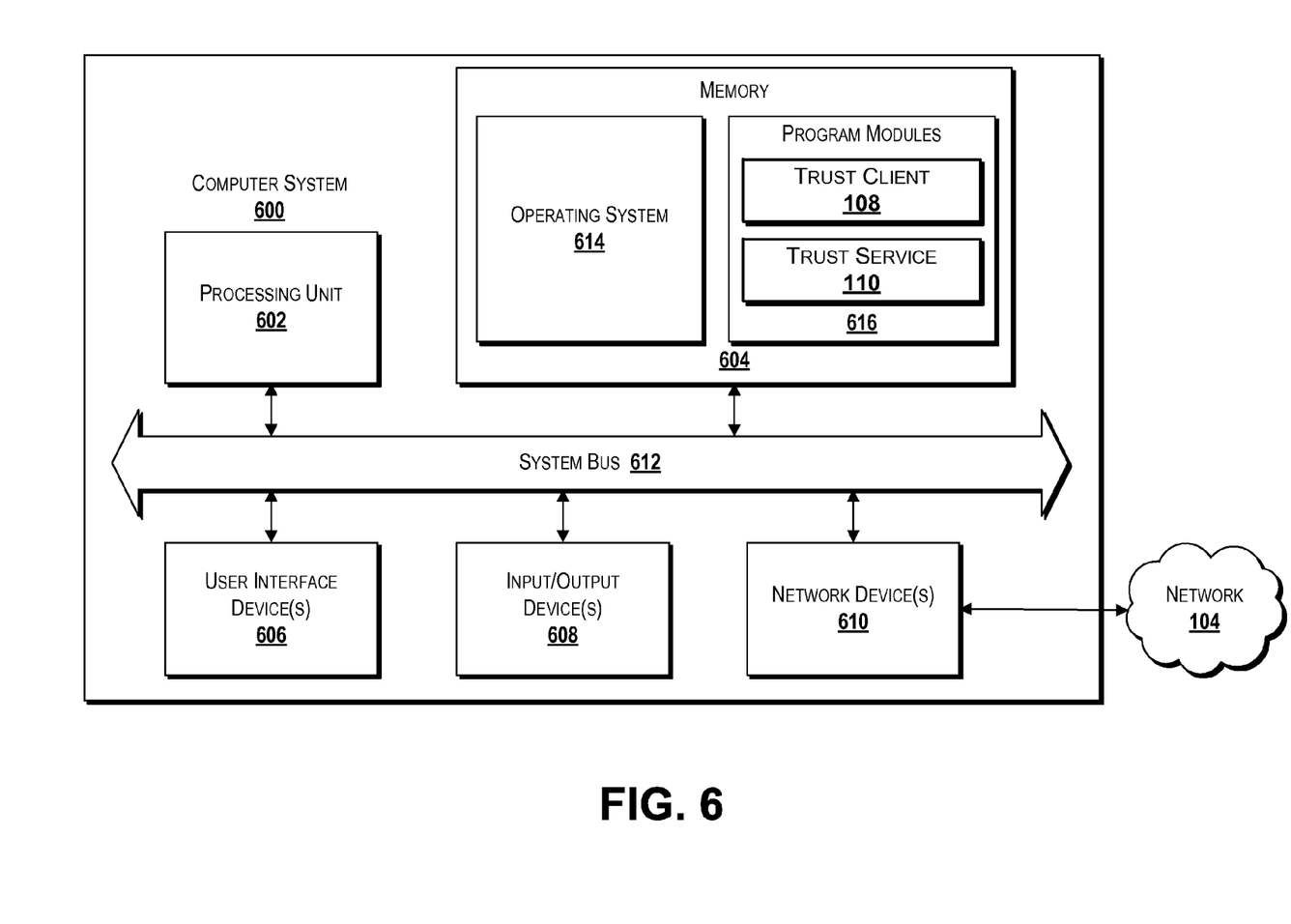
FIG. 6 is a block diagram illustrating an example computer system configured to manage trust relationships between applications, according to some illustrative embodiments.

FIG. 6 is a block diagram illustrating a computer system 600 configured to provide the functionality described herein for a verification service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the trust client 108 and/or the trust service 110. This and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the data 114 and/or other information, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for a peer applications trust center have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. A method comprising:
registering, at a processor executing a trust service, a first application, wherein registering the first application comprises generating an identifier that identifies services associated with the first application;
receiving, at the processor, a request to establish a trust relationship between a second application requestor and the first application, the request being received from the second application;
determining, by the processor, if the trust relationship is to be established;
issuing, by the processor and to the second application, a token in response to determining that the trust relationship is to be established;
issuing, by the processor, an error code in response to determining that the trust relationship is not to be established;
receiving an application access request from the second application, the application access request comprising the identifier; and
challenging the second application, based upon the token, to determine if the access request is to be granted, wherein the identifier comprises a globally unique identifier.

2. The method of claim 1, wherein the request to establish the trust relationship comprises a name associated with the first application.

3. The method of claim 2, wherein determining if the trust relationship is to be established comprises
examining the name associated with the first application,
determining if the name comprises a recognized identifier associated with the first application, and
determining that the trust relationship is to be established, if the name comprises the recognized identifier.

4. The method of claim 1, wherein issuing the token comprises:
determining a time period for which the token is to be valid;
specifying the life of the token, the life of the token comprising data indicating the time period; and
issuing the token with the specified life of the token.

5. The method of claim 4, further comprising:
determining if the token is expired; and
issuing a new token, in response to determining that the token is expired.

6. The method of claim 1, further comprising:
determining that a new version of the token is available;
revoking the token; and
issuing the new version of the token.

7. The method of claim 1, wherein the error code specifies an error associated with the request and an action to be taken in response to determining that the trust relationship is not to be established.

8. A method comprising:
registering, at a processor executing a trust service, a first application executing on a first application server;
generating, by the processor, a globally unique identifier that identifies services associated with the first application;
receiving, by the processor and from a second application, a request to establish a trust relationship between the second application and the first application executed by the first application server, wherein the request to establish the trust relationship comprises a name associated with the first application, and wherein the second application is executed by a second application server;
determining, by the processor, if the trust relationship is to be established based upon the name included in the request;
issuing, by the processor and to the second application, a token in response to determining that the trust relationship is to be established;
issuing, by the processor, an error code in response to determining that the trust relationship is not to be established;
receiving an application access request from the second application, the application access request comprising the identifier; and
challenging the second application, based upon the token, to determine if the access request is to be granted, wherein the identifier comprises a globally unique identifier.

9. The method of claim 8, wherein determining if the trust relationship is to be established comprises
examining the name,
determining if the name comprises a recognized identifier associated with the first application, and
determining that the trust relationship is to be established, if the name comprises the recognized identifier.

10. The method of claim 8, wherein the error code specifies an action to be taken in response to determining that the trust relationship is not to be established.

11. A computer storage medium having computer-executable instructions stored thereon that, when executed by a processor, cause the processor to perform operations comprising:
registering a first application executing on a first application server;
generating an identifier that identifies services associated with the first application;
receiving, from a second application executing on a second application server, a request to establish a trust relationship between the second application executing on the second application server and the first application executing on the first application server, wherein the request to establish the trust relationship comprises a name associated with the first application;
determining if the trust relationship is to be established based upon the name included in the request;
issuing a token to the second application, in response to determining that the trust relationship is to be established;
issuing an error code, in response to determining that the trust relationship is not to be established;
receiving an application access request from the second application, the application access request comprising the identifier; and
challenging the second application, based upon the token, to determine if the access request is to be granted, wherein the identifier comprises a globally unique identifier.

12. The computer storage medium of claim 11, further comprising computer-executable instructions that, when executed by the processor, cause the processor to perform operations further comprising:
receiving an application access request from the second application, the application access request comprising the identifier; and
challenging the second application, based upon the identifier, to determine if the access request is to be granted.

13. The computer storage medium of claim 11, further comprising computer-executable instructions that, when executed by the processor, cause the processor to perform operations further comprising:
   examining the name,
     determining if the name comprises a recognized identifier associated with the first application, and
     determining that the trust relationship is to be established, if the name comprises the recognized identifier.

14. The computer storage medium of claim 11, wherein the error code is used to prevent the second application from using the first application.

15. The computer storage medium of claim 11, wherein the error code causes deletion of the token from a token list.

16. The computer storage medium of claim 11, wherein the error code causes an addition of a further token to a token list.

* * * * *